(12) United States Patent
Nowatari et al.

(10) Patent No.: US 8,475,974 B2
(45) Date of Patent: Jul. 2, 2013

(54) MEMBRANE ELECTRODE ASSEMBLY AND FUEL CELL

(75) Inventors: Yuko Nowatari, Kobe (JP); Takahiro Isono, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1134 days.

(21) Appl. No.: 12/410,842

(22) Filed: Mar. 25, 2009

(65) Prior Publication Data

US 2009/0246593 A1  Oct. 1, 2009

(30) Foreign Application Priority Data

Mar. 31, 2008 (JP) ................................. 2008-091635
Jan. 30, 2009 (JP) ................................. 2009-019120

(51) Int. Cl.
*H01M 8/10* (2006.01)
*H01M 4/02* (2006.01)

(52) U.S. Cl.
USPC ........... 429/523; 429/482; 429/483; 429/491; 429/492

(58) Field of Classification Search
None
See application file for complete search history.

(56) References Cited

U.S. PATENT DOCUMENTS

2004/0151961 A1* 8/2004 Morishima et al. ............ 429/32
2004/0241516 A1* 12/2004 Kimura et al. ................. 429/32

FOREIGN PATENT DOCUMENTS

JP    2004-146092    5/2004

* cited by examiner

*Primary Examiner* — Milton I Cano
*Assistant Examiner* — Sarah A Slifka
(74) *Attorney, Agent, or Firm* — McDermott Will & Emery LLC

(57) ABSTRACT

A membrane electrode assembly includes an electrolyte membrane, anode catalyst layers, and cathode catalyst layers provided counter to the anode catalyst layers, respectively. An insulating layer is provided on the electrolyte membrane between adjacent anode catalyst layers. An insulating layer is provided on the electrolyte membrane between adjacent cathode catalyst layers. The resistivity of the insulating layer is preferably identical to or higher than that of the electrolyte membrane.

9 Claims, 11 Drawing Sheets

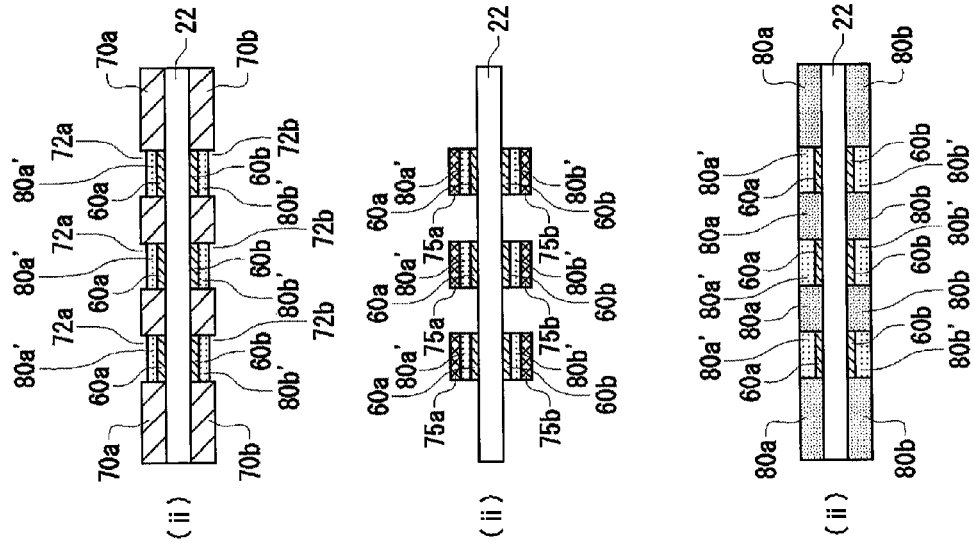
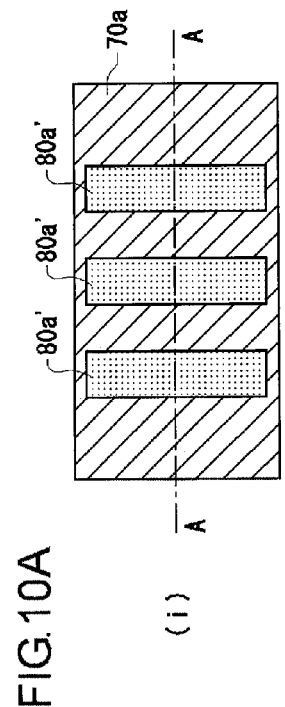
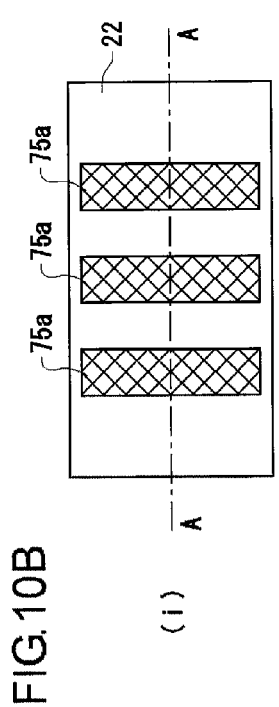
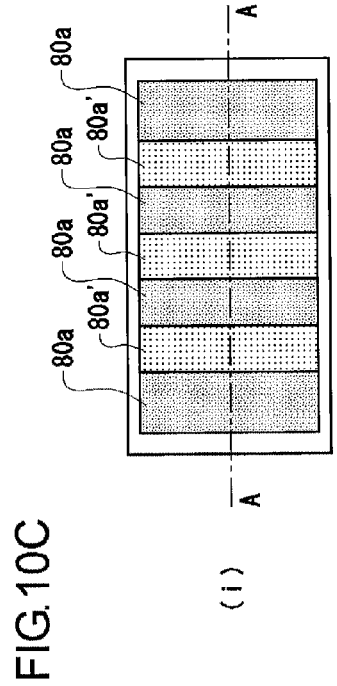
FIG.10A  FIG.10B  FIG.10C

MEMBRANE ELECTRODE ASSEMBLY AND FUEL CELL

CROSS-REFERENCE TO RELATED APPLICATIONS

This application is based upon and claims the benefit of priority from the prior Japanese Patent Applications No. 2008-091635, filed Mar. 31, 2008, and Japanese Patent Application No. 2009-019120, filed Jan. 30, 2009, the entire contents of which are incorporated herein by reference.

BACKGROUND OF THE INVENTION

1. Field of the Invention

The present invention relates to a fuel cell and, in particular, to a fuel cell with its cells disposed in a planar arrangement.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and, as such, environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, and electronic dictionaries and books. Well known as the polymer electrolyte fuel cells for mobile devices are planar fuel cells, which have a plurality of single cells arranged in a plane. And as a fuel to be used for this type of fuel cells, hydrogen stored in a hydrogen storage alloy or a hydrogen cylinder, as well as methanol, is a subject of continuing investigations.

With a planar fuel cell with its cells arranged in a plane, the total area of catalysts is proportional to the electric power. On the other hand, the voltage depends on the number of cells connected in series. Accordingly, in order to downsize the fuel cell and obtain necessary power and voltage, the spacing between catalyst layers needs to be as small as possible and the a catalyst area needs to be as large as possible. However, as the spacing between the catalyst layers gets smaller and shorter, a problem of short-circuiting arises.

In the forming of catalyst layers disposed at fine intervals, laser processing is useful but there is a problem where the laser processing cuts off the bonding of side chains in a molecular structure of electrolyte membrane. Also, as the heat caused by the laser processing transfers across the electrolyte membrane, there is another problem where the electrolyte membrane deteriorates. When such a structural alteration and deterioration occur in the electrolyte membrane and also hydrogen is used as fuel, a problem arises where the hydrogen leaks and the performance of fuel cell deteriorates.

SUMMARY OF THE INVENTION

The present invention has been made in view of the foregoing problems, and an advantage thereof is to provide a technology capable of narrowing the interval (spacing) between cells while short-circuiting is prevented in a planar fuel cell with its cells disposed in a planar arrangement. Another advantage thereof is to provide a technology capable of narrowing the interval (spacing) between cells while a damage to the electrolyte membrane is prevented in a planar fuel cell with its cells disposed in a planar arrangement.

One embodiment of the present invention relates to a membrane electrode assembly. The membrane electrode assembly comprises: an electrolyte membrane containing an ionomer; a plurality of first catalyst layers provided on one face of the electrolyte membrane; a plurality of second catalyst layers, provided on the other face of the electrolyte membrane, corresponding respectively to the plurality of first catalyst layers; an insulating layer provided on the electrolyte membrane in at least one of between adjacent first catalyst layers and between adjacent second catalyst layers.

By employing this embodiment, the occurrence of shorts between the adjacent catalyst layers is prevented and therefore the distance between the catalyst layers can be further shortened. That is, the distance between cells disposed in a planar arrangement can be shortened and therefore the size of a planar fuel cell with its cells arranged in a plane can be further reduced.

In the above-described embodiment, when the insulating layer is provided on a side of the first catalyst layers, an end of the insulating layer in an array direction of cells may be interposed between the electrolyte membrane and the first catalyst layer. In such a case, the first catalyst layer in a region positioned above the end of the insulating layer in the array direction of cells may have the ionomer whose number of C—F bonds is smaller than that in the ionomer of the first catalyst layer in contact with the electrolyte membrane. When the insulating layer is provided on a side of the second catalyst layers, an end of the insulating layer in an array direction of cells may be interposed between the electrolyte membrane and the second catalyst layer. In such a case, the second catalyst layer in a region positioned above the end of the insulating layer in the array direction of cells may have the ionomer whose number of C—F bonds is smaller than that in the ionomer of the second catalyst layer in a region in contact with the electrolyte membrane.

In the above-described embodiment, the insulating layer may contain resin whose number of C—F bonds is larger than that in the ionomer contained in the electrolyte membrane.

In the above-described embodiment, the thermal resistance of the insulating layer may be higher than that of the electrolyte membrane. The insulating layer may have a smaller thermal conductivity than that of the electrolyte membrane. The insulating layer and the electrolyte membrane may be formed of the same material.

Of the first catalyst layers and the second catalyst layers, the catalyst layers on a side where the insulating layer is formed may contain resin whose number of C—F bonds is smaller than that in the ionomer contained in the electrolyte membrane. Of the first catalyst layers and the second catalyst layers, the transmission coefficient of laser light used in processing the catalyst layers on a side where the insulating layer is formed may be lower than the transmission coefficient of laser light used in the electrolyte membrane.

Another embodiment of the present invention relates to a fuel cell. This fuel cell includes any one of the above-described membrane electrode assemblies.

It is to be noted that any arbitrary combinations or rearrangement of the aforementioned structural components and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 10A(i) to 10C(i) and FIGS. 10A(ii) to 10C(ii) are process diagrams showing a method for manufacturing a membrane electrode assembly according to a second embodiment of the present invention; and FIGS. 11(i) and 11(ii) are process diagrams showing a method for manufacturing a membrane electrode assembly according to a second embodiment of the present invention.

DETAILED DESCRIPTION OF THE INVENTION

Figure 1:
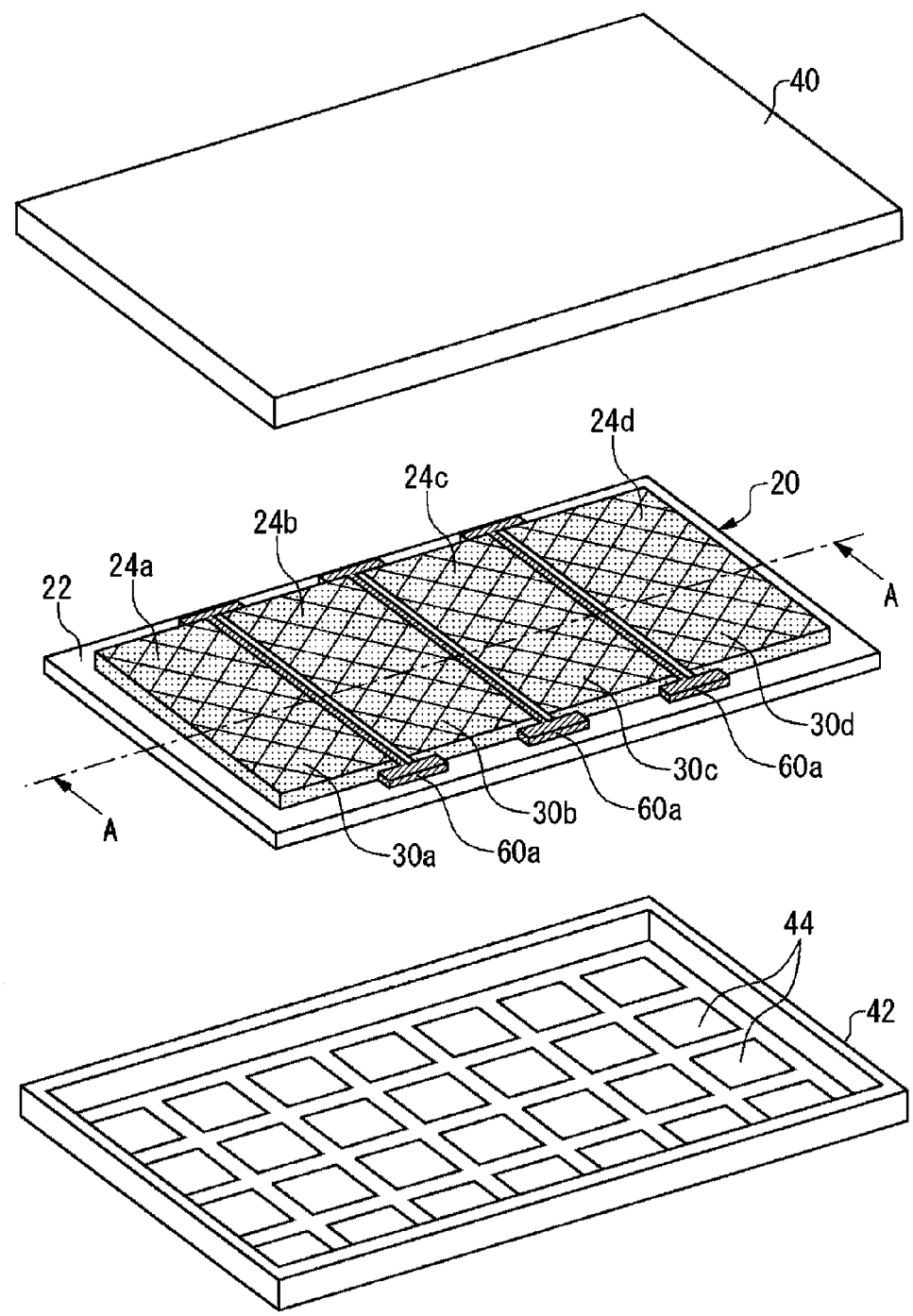
FIG. 1 is an exploded perspective view showing a structure of a fuel cell according to a first embodiment of the present invention.

The invention will now be described by reference to the preferred embodiments. This does not intend to limit the scope of the present invention, but to exemplify the invention.

Hereinbelow, the embodiments will be described with reference to the accompanying drawings. Note that in all of the Figures the same reference numerals are given to the same components and the description thereof is omitted as appropriate.

(First Embodiment)

Figure 2:
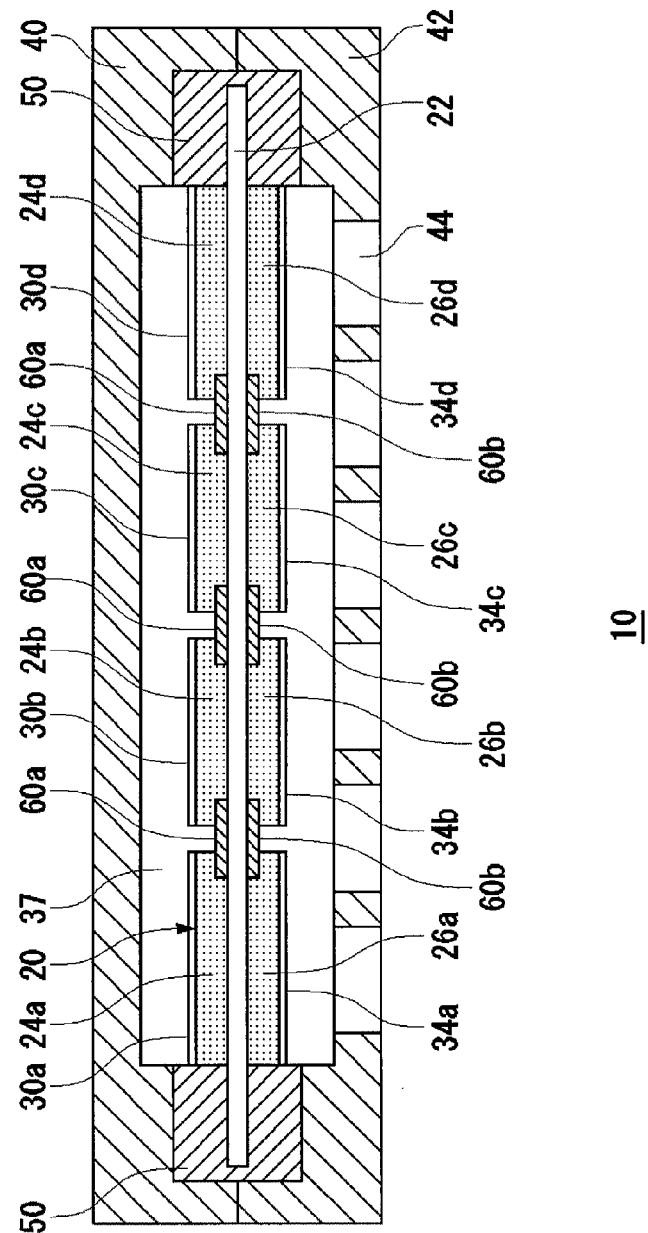
FIG. 2 is a cross-sectional view taken along the line A-A of FIG. 1.

FIG. 1 is an exploded perspective view showing a structure of a fuel cell according to a first embodiment of the present invention. FIG. 2 is a cross-sectional view taken along the line A-A of FIG. 1. As shown in FIG. 1 and FIG. 2, a fuel cell 10 includes a membrane electrode assembly (MEA, also called a catalyst-coated membrane (CCM)) 20, an anode housing 40, and a cathode housing 42. A sealing member 50 (described later) is provided around the peripheral edge part of the membrane electrode assembly 20.

The membrane electrode assembly 20 includes an electrolyte membrane 22, anode catalyst layers 24a to 24d, and cathode catalyst layers 26a to 26d, which are disposed counter to the anodes 24a to 24d, respectively. Hereinafter, the anode catalyst layers 24a to 24d may be collectively called "anode catalyst layer 24" also, and the cathode catalyst layers 26a to 26d may be collectively called "cathode catalyst layer 26" also. Hydrogen is supplied to the anode catalyst layers 24a to 24d as fuel gas. Air is supplied to the cathode catalyst layers 26a to 26d as oxidant. Each cell is structured by a pair of anode catalyst layer and cathode catalyst layer with the electrolyte membrane 22 held between the anode catalyst layer and the cathode catalyst layer. Each cell generates electric power through an electrochemical reaction between hydrogen and oxygen in the air.

The anode catalyst layers 24a to 24d are formed on one face of the electrolyte membrane 22 in such a manner as to be slightly apart therefrom. The area of the electrolyte membrane 22 is larger than the total area of the anode catalyst layers 24a to 24d, and the peripheral edge part of the electrolyte membrane 22 on the anode side surrounds the anode catalyst layers 24a to 24d. The width of the peripheral area of the electrolyte membrane 22 surrounding the anode catalyst layers 24a to 24d is, for instance, 2 mm. Similarly, the cathode catalyst layers 26a to 26d are formed on the other face of the electrolyte membrane 22 in such a manner as to be slightly apart therefrom. The area of the electrolyte membrane 22 is larger than the total area of the cathode catalyst layers 26a to 26d, and the peripheral edge part of the electrolyte membrane 22 on the cathode side surrounds the cathode catalyst layers 26a to 26d. The width of the peripheral area of the electrolyte membrane 22 surrounding the cathode catalyst layers 26a to 26d is, for instance, 2 mm.

In this manner, the fuel cell according to the first embodiment comprises a plurality of cells, in a planar arrangement, which are composed of the respective pairs of the anode catalyst layers 24a to 24d and the cathode catalyst layers 26a to 26d. Current collectors 30a to 30d are provided on the anode catalyst layers 24a to 24d, respectively. Current collectors 34a to 34d are provided on the cathode catalyst layers 26a to 26d, respectively. Hereinafter, the current collectors 30a to 30d may be collectively called "current collector 30" also, and the current collectors 34a to 34d may be collectively called "current collector 34" also. The current collector 30 and the current collector 34 may, for instance, be made of gold mesh, carbon paper, carbon cloth or the like. And the adjacent cells are connected in series by connecting means such as the current collectors 30, the current collectors 34, wiring and interconnectors (not shown).

The electrolyte membrane 22, which preferably shows excellent ion conductivity in a moist condition, functions as an ion-exchange membrane for the transfer of protons between the anode catalyst layer 24 and the cathode catalyst layer 26. The electrolyte membrane 22 is formed of a solid polymer material such as a fluorine-containing polymer or a nonfluorine polymer. The material that can be used is a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is Nafion 112 (made by DuPont in the U.S.A.: registered trademark). Also, an example of the nonfluorine polymer is a sulfonated aromatic polyether ether ketone, polysulfon or the like.

The anode catalyst layer 24 and the cathode catalyst layer 26 are each provided with ion-exchange resin and catalyst particles or carbon particles as the case may be.

The ion-exchange resin provided in the anode catalyst layer 24 and the cathode catalyst layer 26 connects the catalyst particles and the electrolyte membrane 22. This ion-exchange resin plays a role of transferring protons therebetween. This ion-exchange resin may be formed of a polymer material similar to that of the electrolyte membrane 22. A catalyst metal may be a single element or an alloy of two elements selected from among Sc, Y, Ti, Zr, V, Nb, Fe, Co, Ni, Ru, Rh, Pd, Pt, Os, Ir, lanthanoid series element, and actinoid series element. Acetylene black, ketjen black, carbon nanotube or the like may be used as the carbon particle on the case of supporting the catalyst.

The ion-exchange resin provided in the anode catalyst layer 24 and the cathode catalyst layer 26 may have the smaller number of C—F bonds than the number of C—F bonds in an ionomer contained in the electrolyte membrane 22, as with a hydrocarbon-based ion-exchange resin, for instance.

A fuel storage 37 for storing the fuel is formed by the anode housing 40. Note that if a fuel supply port (not shown) is formed in the anode housing 40, fuel can be supplied as needed from a fuel cartridge or the like.

On the other hand, the cathode housing 42 is provided with an air inlet 44 for feeding air from outside.

The anode housing 40 and the cathode housing 42 are fastened to each other by fasteners (not shown), such as bolts and nuts, via the sealing member 50. The fasteners giving pressure to the sealing member 50 improve the sealing performance of the sealing member 50.

In the membrane electrode assembly 20 according to the first embodiment, insulating layers 60a are provided on the electrolyte membrane 22 between adjacent anode catalyst layers 24. Also, insulating layers 60b are provided on the electrolyte membrane 22 between adjacent cathode catalyst layers 26. Hereinafter, the insulating layers 60a and 60b may be collectively called "insulating 60" also.

It is desired that the resistivity of the insulating layer 60 be identical to or higher than that of the electrolyte membrane 22. This prevents shorts from occurring between the adjacent anode catalyst layers. Hence, the distance between the anode catalyst layers can be further shortened. Similarly, since shorts occurring between the adjacent cathode catalyst layers are prevented, the distance between the cathode catalyst layers can be further shortened. That is, the distance between cells disposed in a planar arrangement can be shortened and therefore the size of a planar fuel cell can be further reduced.

If the resistivity of the insulating layer 60 is equal to that of the electrolyte membrane 22, the same ionomer as that used for the electrolyte membrane 22 can be used for the insulating layer 60.

In the membrane electrode assembly 20 according to the first embodiment, an end of the insulating layer 60a is placed between the electrolyte membrane 22 and the anode catalyst layer 24. In other words, the width of the insulating layer 60a is longer than the distance between the adjacent anode catalyst layers 24. Similarly, an end of the insulating layer 60b is placed between the electrolyte membrane 22 and the cathode catalyst layer 26. In other words, the width of the insulating layer 60b is longer than the distance between the adjacent cathode catalyst layers 26. The end of the insulating layer 60a and the end of the insulating layer 60b are each an end in the direction of A-A of FIG. 1 (i.e., in an array direction or longitudinal direction of cells of the membrane electrode assembly 20 in the first embodiment).

With this structure described as above, the conductivity between the end of the anode catalyst layer 24 and the electrolyte membrane 22 is blocked by the insulating layer 60a. Thus, the above-described effect of the suppression of short-circuiting between the anode catalyst layers can be further enhanced. Also, the conductivity between the end of the cathode catalyst layer 26 and the electrolyte membrane 22 is blocked by the insulating layer 60b. Thus, the above-described effect of the suppression of short-circuiting between the cathode catalyst layers can be further enhanced.

(Fabrication Method of Membrane Electrode Assembly)

A method for manufacturing a membrane electrode assembly 20 according to the first embodiment is now described with reference to FIGS. 3A to 3C and FIGS. 4A to 4C. FIGS. 3A to 3C and FIGS. 4A to 4C are process diagrams showing a method for manufacturing a membrane electrode assembly 20 according to the first embodiment. In FIGS. 3A to 3C and FIGS. 4A to 4C, diagrams on the left (i) show plan views whereas those on the right (ii) shows cross-sectional views taken along the lines A-A of the respective plan views.

Figure 3A:
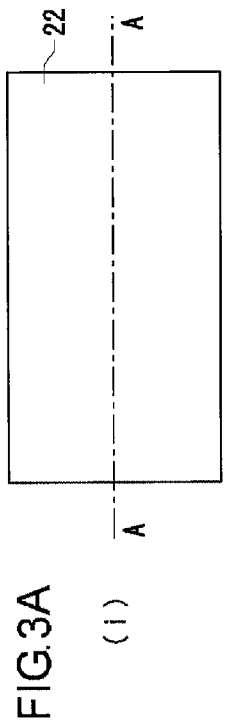
FIGS. 3A(i) to 3C(i) and FIGS. 3A(ii) to 3C(ii) are process diagrams showing a method for manufacturing a membrane electrode assembly according to a first embodiment of the present invention.

As shown in FIG. 3A, an electrolyte membrane 22 is prepared. The film thickness of the electrolyte membrane 22 is about 20 µm to about 150 µm. For example, a Nafion membrane may be used as the electrolyte membrane 22.

Figure 3B:
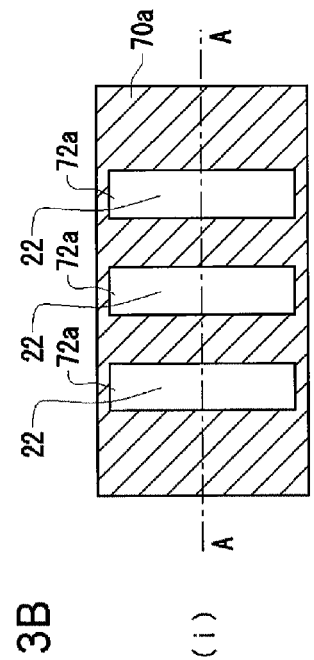

Then, as shown in FIG. 3B, a mask (metallic mold) 70a having openings 72a, whose width is about 500 µm, corresponding to insulating layer forming regions on an anode side thereof are placed on one main face of the electrolyte membrane 22. Similarly, a mask (metallic mold) 70b having openings 72b, whose width is about 500 µm, corresponding to insulating layer forming regions on an cathode side thereof are placed on the other main face of the electrolyte membrane 22.

Figure 3C:
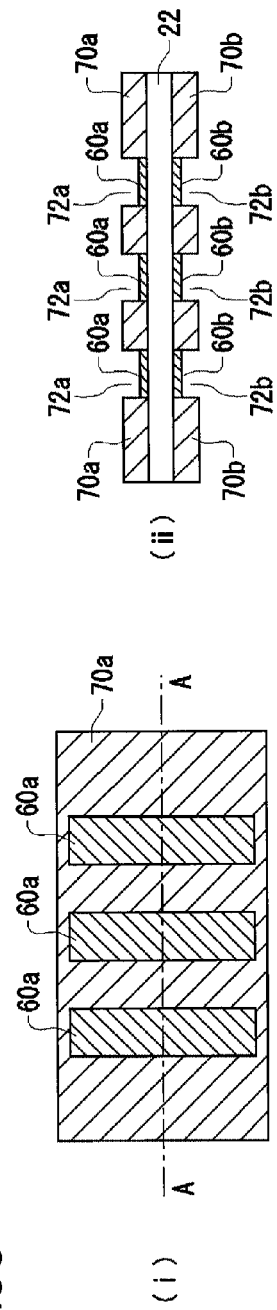

Then, as shown in FIG. 3C, insulating layers 60a are formed on the electrolyte membrane 22 in positions corresponding to the openings 72a. Similarly, insulating layers 60b are formed on the electrolyte membrane 22 in positions corresponding to the openings 72b. More specifically, an ionomer dispersion solution such as Nafion dispersion solution is applied to the electrolyte membrane 22 from above the mask 70a by using a spray coating, which forms the insulating layers 60a. Similarly, the ionomer dispersion solution such as Nafion dispersion solution is applied to the electrolyte membrane 22 from above the mask 70b by using the spray coating, which forms the insulating layers 60b. As described above, it is desired that the resistivity of the insulating layer 60 be higher than that of the electrolyte membrane 22. In other words, the resistivity of the Nafion used for the insulating layer 60 is higher than that of the Nafion used for the electrolyte membrane 22.

Figure 4A:
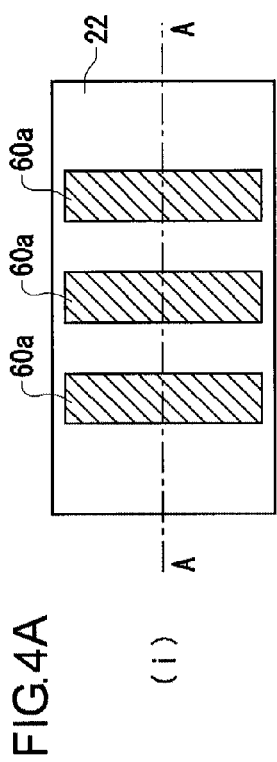
FIGS. 4A(i) to 4C(i) and FIGS. 4A(ii) to 4C(ii) are process diagrams showing a method for manufacturing a membrane electrode assembly according to a first embodiment of the present invention.

Then, as shown in FIG. 4A, the mask 70a and the mask 70b are removed. As a result, a plurality of insulating layers 60a are formed on one main face of the electrolyte membrane 22 in such a manner as to be spaced apart from each other. And a plurality of insulating layers 60b are formed on the other main surface of the electrolyte membrane 22 in such a manner as to be spaced apart from each other.

Some of resin materials such as polyimide used for the insulating layer 60 need to be subjected to heat treatment at a high temperature of 300 to 500° C. in the formation of a resin film. In this case, if the glass transition temperature of the electrolyte membrane 22 is 300° C. or below, the insulating layer 60 may possibly be dissolved or decomposed when the insulating layer 60 is formed. For that reason, the insulating layer 60 may be formed in such a manner that the resin film formed beforehand is cut off in rectangles and then pressurized by using a hot-press method.

Figure 4B:
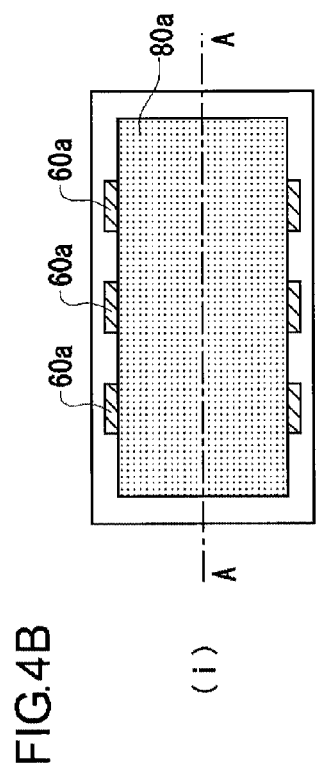

Then, as shown in FIG. 4B, at the side of one main face of the electrolyte membrane 22, a catalyst layer 80a is formed along a longitudinal direction of the electrolyte membrane 22 in such a manner as to lie across a plurality of insulating layers 60a. More specifically, a catalyst slurry is adjusted by sufficiently stirring the water of 10 g, Nafion dispersion solution of 5 g, and platinum black or platinum-supporting carbon of 5 g. And the catalyst layer 80a is formed by spray-coating this catalyst slurry. Similarly, at the side of the other main face of the electrolyte membrane 22, a catalyst layer 80b is formed along a longitudinal direction of the electrolyte membrane 22 in such a manner as to lie across a plurality of insulating layers 60b. More specifically, the catalyst layer 80b is formed by spray-coating the above-mentioned catalyst slurry.

Figure 4C:
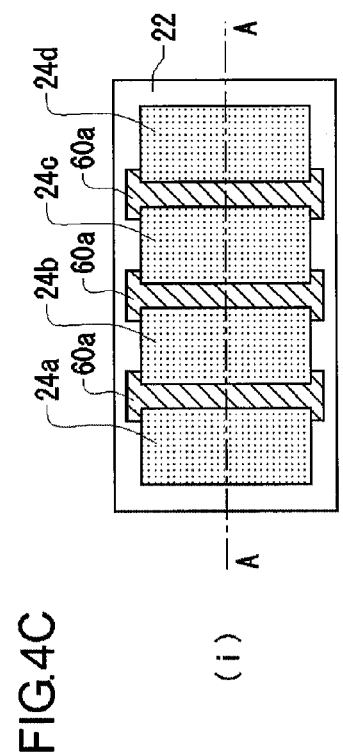

Then, as shown in FIG. 4C, a predetermined region of the catalyst layer 80a provided at one main face of the electrolyte membrane 22, namely a part of the catalyst layer 80a corresponding to a central region of each insulating layer 60a, is removed by using excimer laser. Here, the width of the predetermined region of the catalyst layer 80a to be removed is preferably in the range of 1 to 500 μm and more preferably in the range of 50 to 200 μm. This removal of the predetermined regions segmentalizes the catalyst layer 80a and exposes the central regions of the insulating layers 60a, thereby forming the anode catalyst layers 24a to 24d.

Also, a predetermined region of the catalyst layer 80b provided at the other main face of the electrolyte membrane 22, namely a part of the catalyst layer 80b corresponding to a central region of each insulating layer 60b, is removed by using excimer laser. Here, the width of the predetermined region of the catalyst layer 80b to be removed is preferably in the range of 1 to 500 μm and more preferably in the range of 50 to 200 μm. This removal of the predetermined regions segmentalizes the catalyst layer 80b and exposes the central regions of the insulating layers 60b, thereby forming the cathode catalyst layers 26a to 26d. YAG third harmonic laser, $YVO_4$ fourth harmonic green laser or the like whose oscillation wavelength is greater than or equal to 180 nm and less than or equal to 550 nm may be used as laser for the removal of the catalyst layer, in place of the excimer laser. The level of the output of laser is preferably such that the predetermined regions of the catalyst layers to be irradiated with the laser can be completely removed thereby. And it is preferable that the output of laser is adjusted as appropriate in accordance with the material and/or thickness of the catalyst layer.

According to this fabrication method and the structure, the electrolyte membrane 22 is protected by the insulating layers 60a when a part of the catalyst layer 80a is removed by using the laser processing. Thus, the structural alteration and deterioration in the electrolyte membrane 22 is suppressed. Also, the electrolyte membrane 22 is protected by the insulating layers 60b when a part of the catalyst layer 80b is removed by using the laser processing, so that the structural alteration and deterioration in the electrolyte membrane 22 is suppressed.

Thus, the membrane electrode assembly 20 according to the first embodiment is manufactured through the above-described processes. Though the anode and the cathode are subjected to the similar process in each process and then a subsequent process is performed, the anode may be subjected to a series of processes and then the cathode may be subjected to a series of processes.

Where the insulating layers 60 are formed by the laser processing as described above, characteristics desired in the insulating layers 60 are as follows ((1) to (3)).

(1) It is desirable that a fluorine-containing polymer be used as the insulating layer 60 and the number of C—F bonds in the fluorine-containing polymer contained in the insulating layer 60 be larger than that in the ionomer contained in the electrolyte membrane 22. Here, the number of C—F bonds indicates the number of C—F bonds present per unit weight, and can be evaluated by using an XPS (X-ray Photoelectron Spectroscopy), for instance. Note that the bonding energy of the C—F bond is higher than the energy of excimer laser (wavelength: 248 nm) used for the laser processing and therefore the larger the number of C—F bonds becomes, the less likely the structural alteration due to the excimer laser will be caused.

More specifically, when Nafion is used for the insulating layer 60, the following electrolyte membrane may be used as the electrolyte membrane 22 whose number of C—F bonds is smaller than that in the insulating layer 60. That is, used is an electrolyte member such as thickened poly-2-acrylamido-2-methylpropanesulfonic acid obtained after the following dispersion solutions are cast. Here, cast are a 5 wt % dispersion solution of sulfonated poly (styrene-ran-ethylene) using 1-propanol as a solvent, a 5 wt % dispersion solution of sulfonated polystyrene-block-poly(ethylene-ran-butylene)-block-polystyrene using 1-propanol and dichloroethane as a solvent, a 5 wt % dispersion solution of bridgeable sulfonated poly (styrene-ran-ethylene) using 1-propanol as a solvent, and a 5 wt % dispersion solution of bridgeable sulfonated polystyrene-block-poly(ethylene-ran-butylene)-block-polystyrene using 1-propanol and dichloroethane as a solvent, respectively.

According to this fabrication method, molecules that constitute the insulating layer 60a is less likely to subject to the structural alteration even if the insulating layer 60a is irradiated with laser when a part of the catalyst layer 80a is to be removed by using the laser processing. Also, molecules that constitute the insulating layer 60b is less likely to subject to the structural alteration even if the insulating layer 60b is irradiated with laser when a part of the catalyst layer 80b is removed by using the laser processing.

It is desirable that the number of C—F bonds in the ionomer contained in the catalyst layer 80b be smaller than that in the fluorine-containing polymer contained in the insulating layer 60. This facilitates the laser processing of the catalyst layer 80a and the catalyst layer 80b and therefore the processing accuracy of the anode catalyst layer 24 and the cathode catalyst layer 26 improves.

(2) It is desirable that the thermal resistance of the insulating layer 60 is higher than that of the electrolyte membrane 22. The insulating layer 60 having such a property may be phenol resin and polyimide, for instance.

According to this fabrication method and the structure, the insulating layer 60a is less likely to deteriorate even if the insulating layer 60a is irradiated with laser when a part of the catalyst layer 80a is to be removed by using the laser processing. Also, the insulating layer 60b is less likely to deteriorate even if the insulating layer 60b is irradiated with laser when a part of the catalyst layer 80b is to be removed by using the laser processing.

(3) It is desirable that the insulating layer 60 has a smaller thermal conductivity than that of the electrolyte membrane 22. Such the insulating layer 60 may be polyimide and cellulose, for instance.

According to this structure, heat is less likely to transfer to the electrolyte membrane 22 through the insulating layer 60a when a part of the catalyst layer 80a is to be removed by using the laser processing, so that the deterioration of the electrolyte membrane 22 is suppressed. Also, heat is less likely to transfer to the electrolyte membrane 22 through the insulating layer 60b when a part of the catalyst layer 80b is to be removed by using the laser processing, so that the deterioration of the electrolyte membrane 22 is suppressed.

It is desirable that the insulating layer 60 has a lower laser beam transmission factor than that of the electrolyte membrane 22. If the oscillation wavelength of laser is in the range of 180 nm to 550 nm, polyimide, sulfonated polyimide, polycarbonate, methacryl resin or the like may be used for such the insulating layer 60 that cuts off such laser beam. According to this structure, blocking the laser beam by the insulating layer 60a can prevent the laser beam from transmitting through the electrolyte membrane 22 and removing the catalyst layer 80b, when a part of the catalyst layer 80a is to be removed by using the laser processing. Also, blocking the laser beam by the insulating layer 60b can prevent the laser beam from transmitting through the electrolyte membrane 22 and removing the catalyst layer 80a, when a part of the catalyst layer 80a is to be removed by using the laser processing.

Example 1

In Example 1, Nafion membrane is used as the electrolyte membrane. The Nafion membrane is formed on the electrolyte membrane as an insulating layer. The catalyst slurry by using Nafion as an ionomer is applied to both faces of the electrolyte membrane so as to prepare a membrane electrode assembly of Example 1. That is, in the membrane electrode assembly according to the first embodiment, the same material is used for both the electrolyte membrane and the insulating layer. Then the laser processing is performed on only one surface of the membrane electrode assembly by using excimer laser.

Comparative Example 1

In Comparative Example 1, Nafion membrane is used as the electrolyte membrane. The catalyst slurry by using Nafion as an ionomer is applied to both faces of the electrolyte membrane so as to prepare a membrane electrode assembly of Comparative Example 1. Similar to Example 1, the laser processing is performed on only one surface of the membrane electrode assembly by using excimer laser.

Experimental Result 1

Gas diffusion layer (GDL) is placed on both sides of the membrane electrode assembly in Example 1 and Comparative Example 1, so that a testing jig is incorporated in a state where a plurality of cells are connected in parallel. Then, hydrogen is supplied to the anode, whereas air is supplied to the cathode. In this state, the OCV value at 50° C. is measured. The measurement result is shown in Table 1.

TABLE 1

|  | Example 1 | Comparative Example 1 | Reference (normal cell) |
|---|---|---|---|
| OCV value | 0.973 V | 0.921 V | 0.97-0.98 V |

Here, the normal cell is a cell not subjected to the laser processing in Comparative Example 1.

Example 1 exhibits the OCV value equivalent to that of the normal cell not subjected to the laser processing. Thus it is found that the provision of the insulating layer can prevent the cross leak through the electrolyte membrane. On the other hand, the OCV value in Comparative Example 1 is smaller than that of Example 1 by about 50 mV. This confirms that a cross leak occurs in the electrolyte membrane of Comparative Example 1 due to laser.

Example 2

In Example 2, Nafion membrane is used as the electrolyte membrane. The Nafion membrane is formed on the electrolyte membrane as an insulating layer. Then the catalyst slurry using sulfonated polystyrene-block-poly(ethylene-ran-butylene)-block-polystyrene as an ionomer is applied to both faces of the electrolyte membrane so as to prepare a membrane electrode assembly of Example 2. The laser processing is performed on only one surface of the membrane electrode assembly by using excimer laser.

Experimental Result 2

Figure 5:
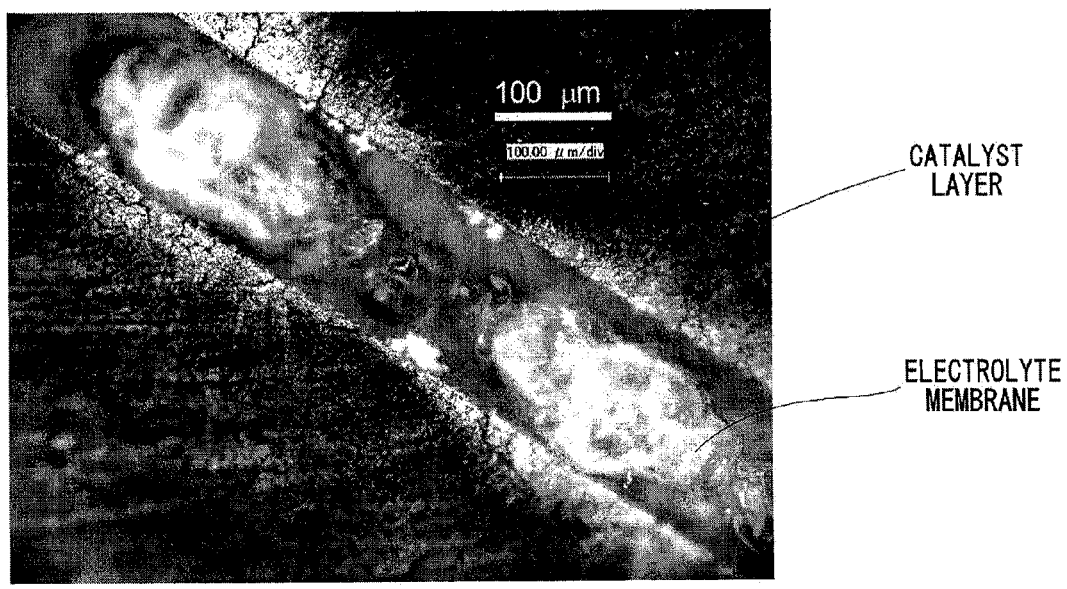
FIG. 5 is a photograph showing a plan view of a membrane electrode assembly, after subjected to laser irradiation, according to Comparative Example 1.

An observation of Comparative Example 1, which is a photograph of a membrane electrode assembly, after subjected to laser irradiation, according to Comparative Example 1 is shown in FIG. 5. Bubble-like matters occur in regions which are irradiated with laser. This verifies that the electrolyte membrane is damaged by laser irradiation.

Figure 6:
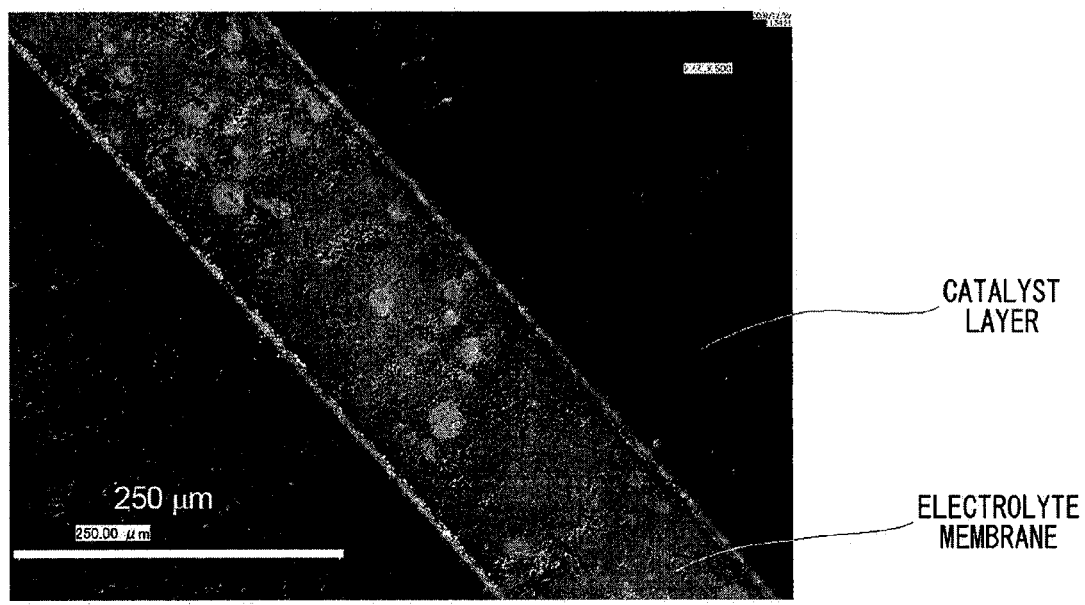
FIG. 6 is a photograph showing a plan view of a membrane electrode assembly, after subjected to laser irradiation, according to Example 2.

An observation of Example 1, which is a photograph of a membrane electrode assembly, after subjected to laser irradiation, according to Example 2 is now shown in FIG. 6. No bubble-like matters occur in the surface of the electrolyte membrane after subjected to the processing of Example 2, and no damage by laser irradiation is observed.

A region where the catalyst is easily removable and a region where the catalyst is not easily removable are mixed together within the catalyst layer, in Comparative Example 1. The intensity of laser is set so that the catalyst can be removed even in the region where it is not easily removable. Thus, in the region where the catalyst is easily removable, an exposed electrolyte membrane is irradiated with laser after the removal of the catalyst, which seems responsible for the damage caused in the electrolyte membrane. In contrast thereto, the region where the catalyst is easily removable and the region where the catalyst is not easily removal are not mixed in Example 2. As a result, the catalyst layer can be removed uniformly.

As a result of the above observation, sulfonated polystyrene-block-poly(ethylene-ran-butylene)-block-polystyrene is more easily processed by excier laser than Nafion is.

Example 3

In Example 3, Nafion membrane is used as the electrolyte membrane. A polyimide membrane is formed on the electrolyte membrane as an insulating layer, and a membrane electrode assembly is formed in a similar manner to Example 1. Then the laser processing is performed on only one surface of the membrane electrode assembly by using green laser.

Comparative Example 2

In Comparative Example 2, Nafion membrane is used as the electrolyte membrane. The catalyst slurry by using Nafion as an ionomer is applied to both faces of the electrolyte membrane so as to form a membrane electrode assembly of Comparative Example 2. Similar to Example 3, the laser processing is performed on only one surface of the membrane electrode assembly by using green laser.

Experimental Result 3

Figure 7:
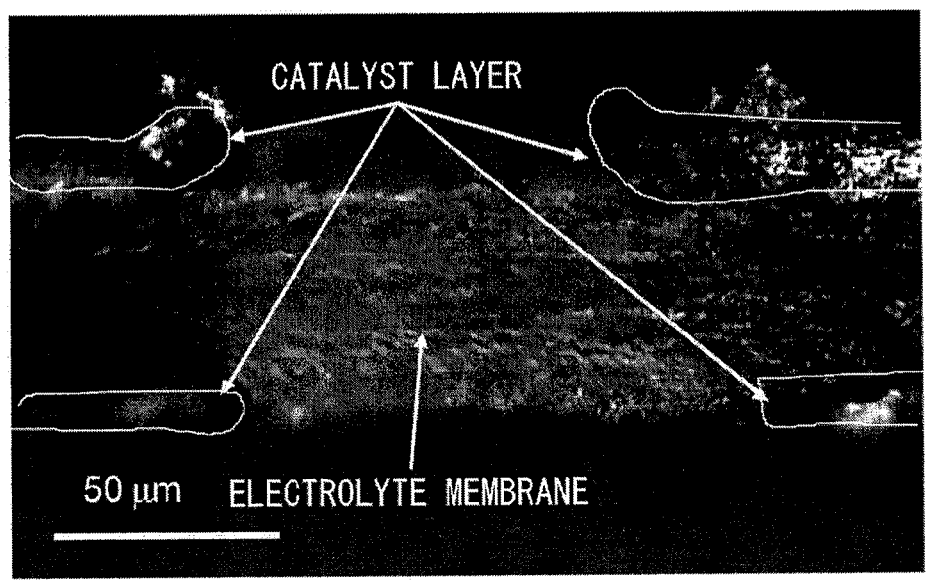
FIG. 7 is a photograph showing a cross-sectional view of a membrane electrode assembly, after subjected to laser irradiation, according to Comparative Example 2.

A photograph showing a cross-sectional view of a membrane electrode assembly, after subjected to laser irradiation, according to Comparative Example 2 is shown in FIG. 7. In Comparative Example 2, though laser is irradiated on only one face of the electrolyte membrane thereof, the laser beam permeates the electrolyte membrane and the catalyst layer on the opposite side is also removed.

Figure 8:
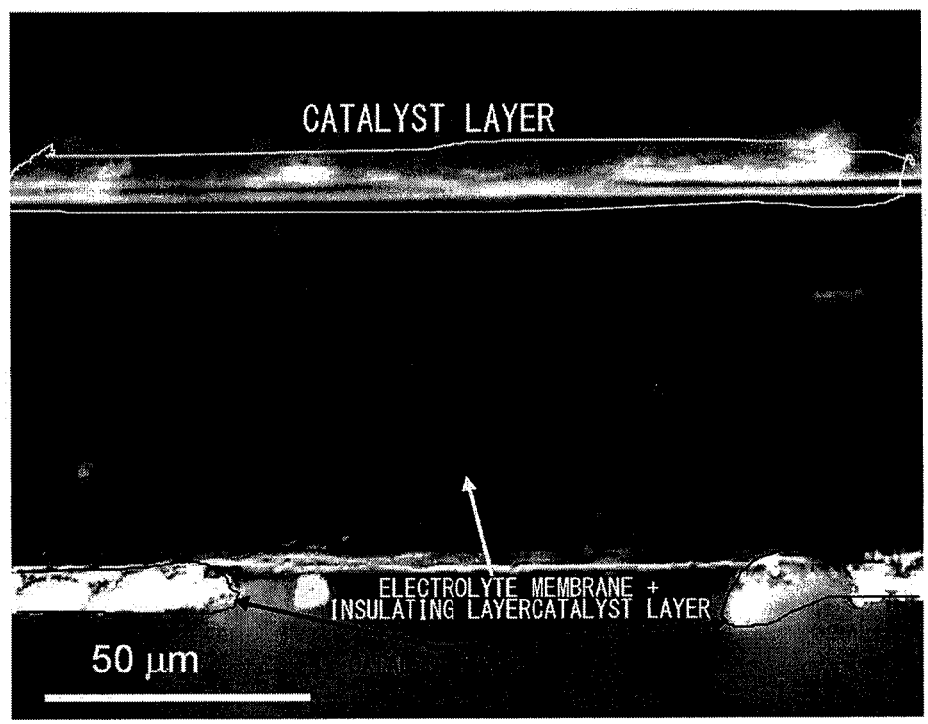
FIG. 8 is a photograph showing a cross-sectional view of a membrane electrode assembly, after subjected to laser irradiation, according to Example 3.

A photograph showing a cross-sectional view of a membrane electrode assembly, after subjected to laser irradiation, according to Example 3 is now shown in FIG. 8. In Example 3, the polyimide is used and this polyimide blocks the laser beam, and it is found that only the side of the catalyst layer irradiated with laser is removed.

The above observation verifies that the provision of the insulating layer 60 for cutting off the laser beam enables the laser processing on one surface only.

(Second Embodiment)

Figure 9:
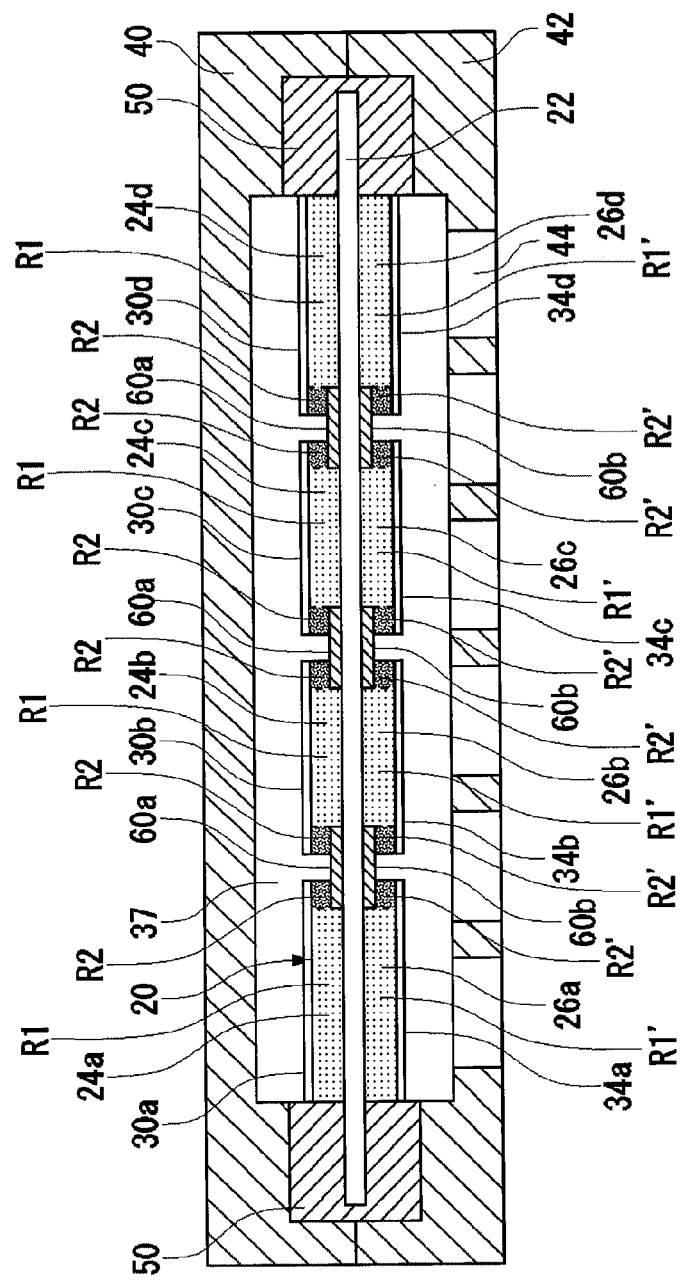
FIG. 9 is a cross-sectional view showing a structure of a membrane electrode assembly according to a second embodiment of the present invention.

FIG. 9 is a cross-sectional view showing a structure of a membrane electrode assembly according to a second embodiment of the present invention. The structure of a membrane electrode assembly 20 according to the second embodiment is the same as that of the first embodiment except for the structures of the anode catalyst layer 24 and the cathode catalyst layer 26.

The anode catalyst layer 24 according to the second embodiment is constituted by two different ionomer components in a region R1 which is in contact with the electrolyte membrane 22 and a region R2 which is positioned above an end of the insulating layer 60a. More specifically, the region R2 of the anode catalyst layer 24 contains the ionomer whose number of C—F bonds is smaller than that in the region R1 thereof.

This facilitates the laser processing of the end of the anode catalyst layer 24. Thus the processing accuracy of the anode catalyst layer 24 improves and realizes further miniaturization of the membrane electrode assembly 20.

Also, the cathode catalyst layer 26 according to the second embodiment is constituted by two different ionomer components in a region R1' which is in contact with the electrolyte membrane 22 and a region R2' which is positioned above an end of the insulating layer 60b. More specifically, the region R2' of the cathode catalyst layer 26 contains the ionomer whose number of C—F bonds is smaller than that in the region R1' thereof.

This facilitates the laser processing of the end of the cathode catalyst layer 26. Thus the processing accuracy of the cathode catalyst layer 26 improves and realizes further miniaturization of the membrane electrode assembly 20.

(Fabrication Method of Membrane Electrode Assembly)

A method for manufacturing a membrane electrode assembly 20 according to the second embodiment is now described with reference to FIGS. 10A to 10C and FIG. 11. FIGS. 10A to 10C and FIG. 11 are process diagrams showing a method for manufacturing a membrane electrode assembly 20 according to the second embodiment. In FIGS. 10A to 10C and FIG. 11, diagrams on the left (i) show plan views whereas those on the right (ii) shows cross-sectional views taken along the lines A-A of the respective plan views.

The method for manufacturing a membrane electrode assembly 20 according to the second embodiment is the same as that according to the first embodiment up to the process of FIGS. 3A to 3C.

After the process shown in FIG. 3C, a catalyst slurry is applied onto an insulating layer 60a in an opening 72a so as to form a catalyst layer 80a' containing an ionomer whose number of C—F bonds is smaller than that in the ionomer of an insulating layer 60a (described later), as shown in FIG. 10A. Similarly, the catalyst slurry is applied onto an insulating layer 60b in an opening 72b so as to form a catalyst layer 80b' containing an ionomer whose number of C—F bonds is smaller than that in the ionomer of an insulating layer 60b (described later). The ionomer used for the catalyst layer 80a' and the catalyst layer 80b' may be, for instance, poly-2-acrylamido-2-methylpropanesulfonic acid obtained after the following dispersion solutions are cast. Here, cast are a 5 wt % dispersion solution of sulfonated poly (styrene-ran-ethylene) using 1-propanol as a solvent, a 5 wt % dispersion solution of sulfonated polystyrene-block-poly(ethylene-ran-butylene)-block-polystyrene using 1-propanol and dichloroethane as a solvent, a 5 wt % dispersion solution of bridgeable sulfonated poly (styrene-ran-ethylene) using 1-propanol as a solvent, and a 5 wt % dispersion solution of bridgeable sulfonated polystyrene-block-poly(ethylene-ran-butylene)-block-polystyrene using 1-propanol and dichloroethane as a solvent, respectively.

Then, as shown in FIG. 10B, the mask 70a and the mask 70b are removed. Then a mask 75a and a mask 75b are placed on the catalyst layer 80a' and the catalyst layer 80b', respectively.

Then, as shown in FIG. 10C, the catalyst layer 80a containing the ionomer whose number of C—F bonds is larger than that in the ionomer of the catalyst layer 80a' is formed by applying a catalyst slurry to a region which is in contact with the electrolyte membrane 22. Then the mask 75a is removed. Similarly, the catalyst layer 80b containing the ionomer whose number of C—F bonds is larger than that in the ionomer of the catalyst layer 80b' is formed by applying a catalyst slurry to a region which is in contact with the electrolyte membrane 22. Then the mask 75b is removed. The ionomer used for the catalyst layer 80a and the catalyst layer 80b may be Nafion, for instance.

Figure 11:
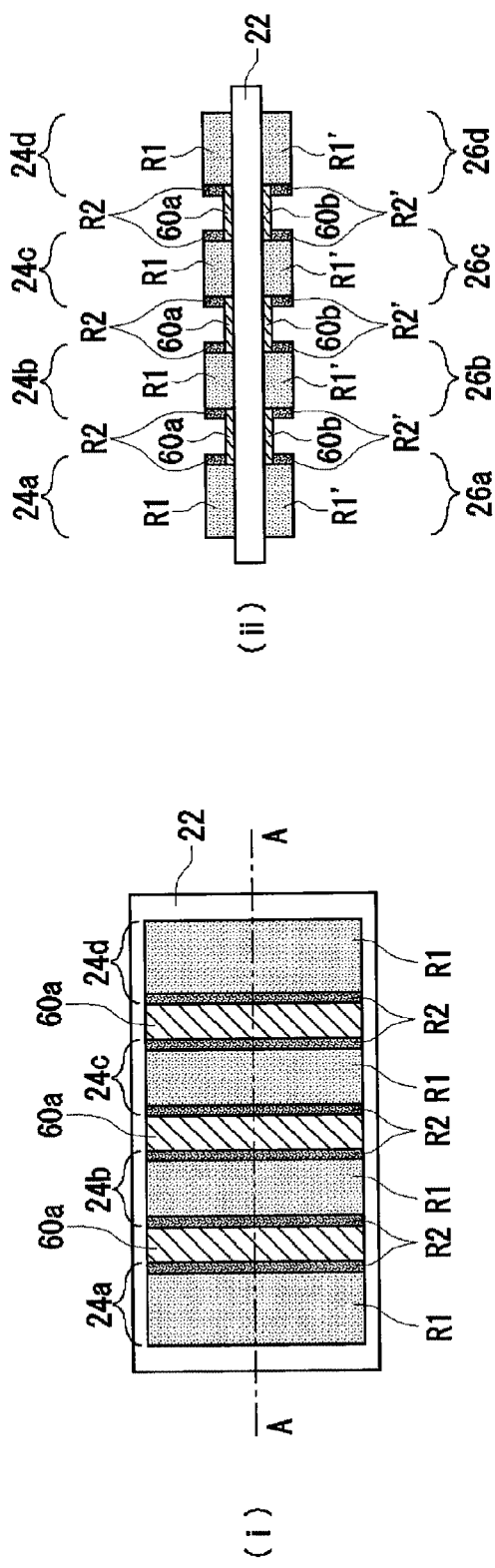

Then, as shown in FIG. 11, a predetermined region of the catalyst layer 80a' provided at one main face of the electrolyte membrane 22, namely a part of the catalyst layer 80a' corresponding to a central region of each insulating layer 60a, is removed by using excimer laser. Here, the width of the predetermined region of the catalyst layer 80a' to be removed is preferably in the range of 1 to 500 μm and more preferably in the range of 50 to 200 μm. This removal of the predetermined regions segmentalizes the catalyst layer 80a' and exposes the central regions of the insulating layers 60a, thereby forming the anode catalyst layers 24a to 24d. Since the number of C—F bonds in the ionomer contained in the catalyst layer 80a' is relatively small, the catalyst layer 80a' can be processed with accuracy and therefore further miniaturization of the membrane electrode assembly 20 can be achieved.

By employing the above-described processes, the anode catalyst layer 24 is constituted by two different ionomer components in the region R1 which is in contact with the electrolyte membrane 22 and the region R2 which is positioned above the end of the insulating layer 60a. Also, the structure is such that the anode catalyst 24 in the region R2 contains the ionomer whose number of C—F bonds is smaller than that contained in the anode catalyst 24 in the region R1.

Also, a predetermined region of the catalyst layer 80b' provided at the other main face of the electrolyte membrane 22, namely a part of the catalyst layer 80b' corresponding to a central region of each insulating layer 60b, is removed by using excimer laser. Here, the width of the predetermined region of the catalyst layer 80b' to be removed is preferably in the range of 1 to 500 μm and more preferably in the range of 50 to 200 μm. This removal of the predetermined regions segmentalizes the catalyst layer 80b' and exposes the central regions of the insulating layers 60b, thereby forming the cathode catalyst layers 26a to 26d. Since the number of C—F bonds in the ionomer contained in the catalyst layer 80b' is relatively small, the catalyst layer 80b' can be processed with accuracy and therefore further miniaturization of the membrane electrode assembly 20 can be achieved.

By employing the above-described processes, the cathode catalyst layer 26 is constituted by two different ionomer components in the region R1' which is in contact with the electrolyte membrane 22 and the region R2' which is positioned above the end of the insulating layer 60b. Also, the structure is such that the cathode catalyst 26 in the region R2' contains the ionomer whose number of C—F bonds is smaller than that contained in the cathode catalyst 26 in the region R1'.

The present invention is not limited to the above-described embodiments only, and it is understood by those skilled in the art that various modifications such as changes in design may be made based on their knowledge and the embodiments added with such modifications are also within the scope of the present invention.

In each of the above-described embodiments, such insulating layers as described above are provided between the catalyst layers on both the anode side and the cathode side of the electrolyte membrane. However, this should not be considered as limiting and, for example, such an insulating layer as described above may be provided between the catalyst layers on only one of the anode side and the cathode side of the electrolyte membrane.

While the preferred embodiments of the present invention and their modifications have been described using specific terms, such description is for illustrative purposes only, and it is to be understood that changes and variations may further be made without departing from the spirit or scope of the appended claims.

What is claimed is:

1. A membrane electrode assembly, comprising:
    an electrolyte membrane containing an ionomer;
    a plurality of first catalyst layers provided on one face of said electrolyte membrane;
    a plurality of second catalyst layers, provided on the other face of said electrolyte membrane, corresponding respectively to said plurality of first catalyst layer; and
    a first insulating layer provided on said electrolyte membrane between adjacent first catalyst layers, wherein:
    an end of said first insulating layer in an array direction of cells is disposed between said electrolyte membrane and said first catalyst layer,
    said first catalyst layer includes a first region positioned above the end of said first insulating layer in the array direction of cells and a second region in contact with said electrolyte membrane,
    the first region of said first catalyst layer includes a first ionomer, and the second region of said first catalyst layer includes a second ionomer, and
    the first ionomer included in the first region has a smaller number of C—F bonds than the second ionomer in the second region.

2. The membrane electrode assembly according to claim 1, wherein said first insulating layer contains resin whose number of C—F bonds is larger than that in the ionomer contained in said electrolyte membrane.

3. The membrane electrode assembly according to claim 1, wherein the thermal resistance of said first insulating layer is higher than that of said electrolyte membrane.

4. The membrane electrode assembly according to claim 1, wherein said first insulating layer has a smaller thermal conductivity than that of said electrolyte membrane.

5. The membrane electrode assembly according to claim 1, wherein said first insulating layer and said electrolyte membrane are made of the same material.

6. The membrane electrode assembly according to claim 1, wherein the number of C—F bonds of the first and second ionomers of the first catalyst layer is smaller than that in the ionomer contained in the electrolyte membrane.

7. The membrane electrode assembly according to claim 1, wherein a transmission coefficient of the first insulating layer with respect to laser light used in processing the catalyst layers is lower than a transmission coefficient of said electrolyte membrane with respect to the laser light.

8. A fuel cell including a membrane electrode assembly according to claim 1.

9. A membrane electrode assembly, comprising:
    an electrolyte membrane containing an ionomer;
    a plurality of first catalyst layers provided on one face of said electrolyte membrane;
    a plurality of second catalyst layers, provided on the other face of said electrolyte membrane, corresponding respectively to said plurality of first catalyst layer; and
    a first insulating layer provided on said electrolyte membrane between adjacent first catalyst layers;
    a second insulating layer provided on said electrolyte membrane between adjacent second catalyst layers, wherein:
    an end of said first insulating layer in an array direction of cells is disposed between said electrolyte membrane and said first catalyst layer,
    an end of said second insulating layer in an array direction of cells is disposed between said electrolyte membrane and said second catalyst layer,
    said second catalyst layer includes a first region positioned above the end of said second insulating layer in the array direction of cells and a second region in contact with said electrolyte membrane,
    the first region of said second catalyst layer includes a first ionomer, and the second region of said second catalyst layer includes a second ionomer, and
    the first ionomer included in the first region has a smaller number of C—F bonds than the second ionomer in the second region.

* * * * *